US010103507B2

(12) United States Patent
Vininski et al.

(10) Patent No.: US 10,103,507 B2
(45) Date of Patent: Oct. 16, 2018

(54) SYSTEM FOR RECLAIMING, REBALANCING AND RECIRCULATING LASER GAS MIXTURES USED IN A HIGH ENERGY LASER SYSTEM

(71) Applicant: Matheson Tri-Gas, Inc., Basking Ridge, NJ (US)

(72) Inventors: Joseph Vininski, Boulder, CO (US); Dane Scott, Doylestown, PA (US)

(73) Assignee: Matheson Tri-Gas, Inc., Basking Ridge, NJ (US)

( * ) Notice: Subject to any disclaimer, the term of this patent is extended or adjusted under 35 U.S.C. 154(b) by 0 days.

(21) Appl. No.: 15/817,270

(22) Filed: Nov. 19, 2017

(65) Prior Publication Data
US 2018/0097331 A1 Apr. 5, 2018

Related U.S. Application Data

(62) Division of application No. 15/244,307, filed on Aug. 23, 2016, now Pat. No. 9,831,627.

(51) Int. Cl.
| | | |
|---|---|---|
| *H01S 3/036* | (2006.01) | |
| *H01S 3/225* | (2006.01) | |
| *H01S 3/104* | (2006.01) | |
| *H01S 3/22* | (2006.01) | |

(52) U.S. Cl.
CPC .............. *H01S 3/036* (2013.01); *H01S 3/104* (2013.01); *H01S 3/225* (2013.01); *H01S 3/2207* (2013.01); *H01S 3/2251* (2013.01); *H01S 3/2255* (2013.01)

(58) Field of Classification Search
CPC ........ H01S 3/036; H01S 3/2207; H01S 3/104; H01S 3/2255; H01S 3/2251; H01S 3/225
See application file for complete search history.

(56) References Cited

U.S. PATENT DOCUMENTS

| | | | | |
|---|---|---|---|---|
| 4,722,090 | A * | 1/1988 | Haruta ..................... | H01S 3/036 372/29.02 |
| 6,014,398 | A * | 1/2000 | Hofmann ............ | G03F 7/70025 372/60 |
| 6,240,117 | B1 * | 5/2001 | Gong ................... | G03F 7/70558 372/57 |
| 8,929,419 | B1 * | 1/2015 | Dean ....................... | H01S 3/036 372/57 |
| 2003/0218754 | A1 * | 11/2003 | Umeda .................. | C23C 14/545 356/485 |
| 2013/0000773 | A1 * | 1/2013 | Jiang ...................... | H01S 3/036 141/8 |

* cited by examiner

*Primary Examiner* — Yuanda Zhang (57) ABSTRACT

The present invention relates to a system for recirculating the gas atmosphere within an excimer laser system, where contaminates, created in the laser's operation, are removed, and the gas concentrations of additive gases, such as Xe, Kr, or others, depleted in the laser operation, are rebalanced to specific lasing mixtures by analyzation and component replenishment from one or more external supplies.

19 Claims, 7 Drawing Sheets

SYSTEM FOR RECLAIMING, REBALANCING AND RECIRCULATING LASER GAS MIXTURES USED IN A HIGH ENERGY LASER SYSTEM

CROSS REFERENCE TO OTHER APPLICATIONS

This application is a divisional of co-pending U.S. patent application Ser. No. 15/244,307, filed Aug. 23, 2016 wherein U.S. patent application Ser. No. 15/244,307 and claims benefit of priority to U.S. Provisional Application No. 62/209,330, filed Aug. 24, 2015, and U.S. Provisional Application No. 62/335,900, filed May 13, 2016 the disclosures of which are fully incorporated herein by reference.

BACKGROUND OF THE INVENTION

1. Field of the Invention

The present invention pertains to, but is not limited to, a system for recirculating the gas atmosphere within an excimer laser system, where contaminates, created in the laser's operation, are removed, and the gas concentrations of additive gases, such as krypton (Kr), xenon (Xe), or others, depleted in the laser operation, are rebalanced to specified lasing mixture concentrations by analyzation and component replenishment from one or more external supplies. This system prevents the loss of significant amounts of the laser gas mixtures, which is important since gases such as Neon (Ne), which can account for approximately 97 percent of the laser gas mixture, are and expensive due to shortages, and lost once vented.

2. Description of the State of the Art

Excimer lasers are pulsed gas discharge lasers which produce optical output in the ultraviolet region of the spectrum. There are four commonly used excimer wavelengths which are dependent upon the active gas fill of the laser, the four wavelengths are:

| Wavelength | Active Gas | Relative Power |
| --- | --- | --- |
| 193 nm | Argon Fluoride (ArF) | 60 |
| 248 nm | Krypton Fluoride (KrF) | 100 |
| 308 nm | Xenon Chloride (XeCl) | 50 |
| 351 nm | Xenon Fluoride (XeF) | 45 |

An excimer lasers are now commonly used in the production of microelectronic devices (semiconductor integrated circuits or "chips"), eye surgery, and micromachining. To operate efficiently, excimer lasers require three or more part, mixtures of rare high-purity noble gases such as krypton (Kr), xenon (Xe), or argon (Ar), and consequently the operation of an excimer laser is expensive. In addition to using rare high-purity noble gases a highly reactive halogen gas, such as, fluorine (F), or chlorine (Cl), apart from helium (He) and/or neon (Ne) as buffer gas, is further utilized. Since such small amounts of Xe are used, and there is a tremendous supply of Ar, there is no concern for recovery for these gases. Furthermore, the buffer gas is the primary gas in the lasing mixture, accounting for up to 99% by weight. The buffer gas also has to be chemically resistant in the excimer lasing gas chamber, as the halogenated gases, such as $F_2$ and $Cl_2$, will react with just about any elements and/or molecules when atomized in the excimer lasing gas chamber. The choices for the buffer gas are He or Ne, and since He has a limited supply and is not recoverable once released to the atmosphere, Ne is the predominant buffer gas used in excimer lasers. With the growing amount of excimer lasers use in the world, there is a concern for Ne shortages, therefore the price of this noble gas has increased dramatically, and the growing need for lasing gas recovery. These gaseous components, and possibly other gases, are contained within a pressure vessel provided with longitudinally extending lasing electrodes for inducing a transverse electrical discharge in the gases. The discharge causes the formation of excited rare gas-halide molecules whose disassociation results in the emission of ultraviolet photons constituting the laser light. During operation, the halogen gas component reacts with materials inside the laser, such as, C, H, and is depleted from the gas mixture requiring periodic replacement. Halogen depletion coincides with the formation of impurities within the laser chamber, which impairs laser operation reducing the laser output power.

In order to maintain a constant power from the laser, the voltage applied to the laser's electrodes can be increased to overcome the reduction in output power caused by the contaminants and the depleted halogen. Unfortunately, the higher voltages lead to a more rapid deterioration of the electrode materials in the laser, and a large increase in maintenance costs. A portion of the laser output energy can be recovered by simply replacing the depleted halogen in the laser chamber; however, without a means to remove the impurities, the laser gas mixture must be eventually replaced to return the laser back to full output.

Accordingly, a significant portion of the operating cost of an excimer laser is therefore related to the contamination of costly, high-purity, noble gases. Over the years many of the challenges associated with excimer lasers have been mitigated through the use of corrosion-resistant materials, advanced gas recirculating and purification systems, and solid-state high-voltage switches. These continued engineering improvements and rise of applications continue to exert a high demand on rare high-purity noble gases. For example, it has recently been demonstrated that a very narrow band pulse excimer laser capable of producing pulses at a rate in the range of about 500 to 2000 Hz with enhanced energy dose control and reproducibility can be achieved by adding small quantities of a laser enhancer consisting of oxygen or a heavy noble gas (xenon or radon for KrF lasers, or krypton, xenon or radon for ArF lasers) to the gas mixture. Tests demonstrated improved performance for the ArF lasers with the addition of about 6-10 ppm of Xe or 40 ppm of Kr.

Accordingly, an improved system for reclaiming, rebalancing and recirculating rare high-purity noble gases and specifically xenon, is needed to ensure a continued supply of these gases at acceptable prices. An object of the present invention is to overcome the shortcomings of the prior art by providing an apparatus and method, which incorporates a unique change to the design concept of an excimer laser, whereby the expensive noble gases are reclaimed, rebalanced and recirculated while removing the impurities developed during operation of the excimer laser.

BRIEF SUMMARY OF THE INVENTION

The present invention relates to a system for recirculating the gas atmosphere within an excimer laser system, where contaminates, created in the laser's operation, are removed, and the gas concentrations of additive gases, such as Xe, Kr, or others, depleted in the laser operation, are rebalanced to specific lasing mixtures by analyzation and component replenishment from one or more external supplies.

In lieu of analyzation, certain embodiments may be required to remove all of the enhancing gas, such as xenon, before component replenishment. This may be achieved by, but not limited to, adsorption by transitional metals, adsorption by high surface area zeolite, alumina, and/or carbon, temperature swing adsorption, pressure swing adsorption. The lasing gas will be rebalanced to specific lasing mixtures with component replenishment from one or more external supplies.

Another embodiment may result in the removal of all lasing gas enhancers and partial removal of noble lasing gases, and isolating the buffer gas, by means of, but not limited to, temperature swing adsorption, pressure swing adoption, membrane separation. The noble lasing gas enhancer will be rebalanced to specific lasing mixtures by analyzation and component replenishment from one or more external supplies.

Another embodiment may result in the removal of all lasing gas enhancers and noble lasing gases, and isolating the buffer gas, by means of, but not limited to, temperature swing adsorption, pressure swing adoption, membrane separation. The noble lasing gas and lasing gas enhancer will be rebalanced to specific lasing mixtures with component replenishment from one or more external supplies.

Another embodiment of the present invention contemplates measuring the lasing intensity and doping in the lasing enhancing gas back into the laser chamber as the lasing intensity decreases. For each of the methods disclosed, component replenishment will be blended to specified lasing mixture from one or more external supplies.

Additional embodiments and features are set forth in the description that follows, and in part will become apparent to those skilled in the art upon examination of the specification or may be learned by the practice of the disclosed embodiments. The features and advantages of the disclosed embodiments may be realized and attained by means of the instrumentalities, combinations, and methods described in the specification.

BRIEF DESCRIPTION OF THE DRAWINGS

A further understanding of the nature and advantages of the disclosed embodiments may be realized by reference to the remaining portions of the specification and the drawings.

In the appended figures, similar components and/or features may have the same reference label. Further, various components of the same type may be distinguished by following the reference label by a dash and a second label that distinguishes among the similar components. If only the first reference label is listed in the specification, the description is applicable to anyone of the similar components having the same first reference label irrespective of the second reference label.

DETAILED DESCRIPTION OF THE INVENTION

Figure 1:
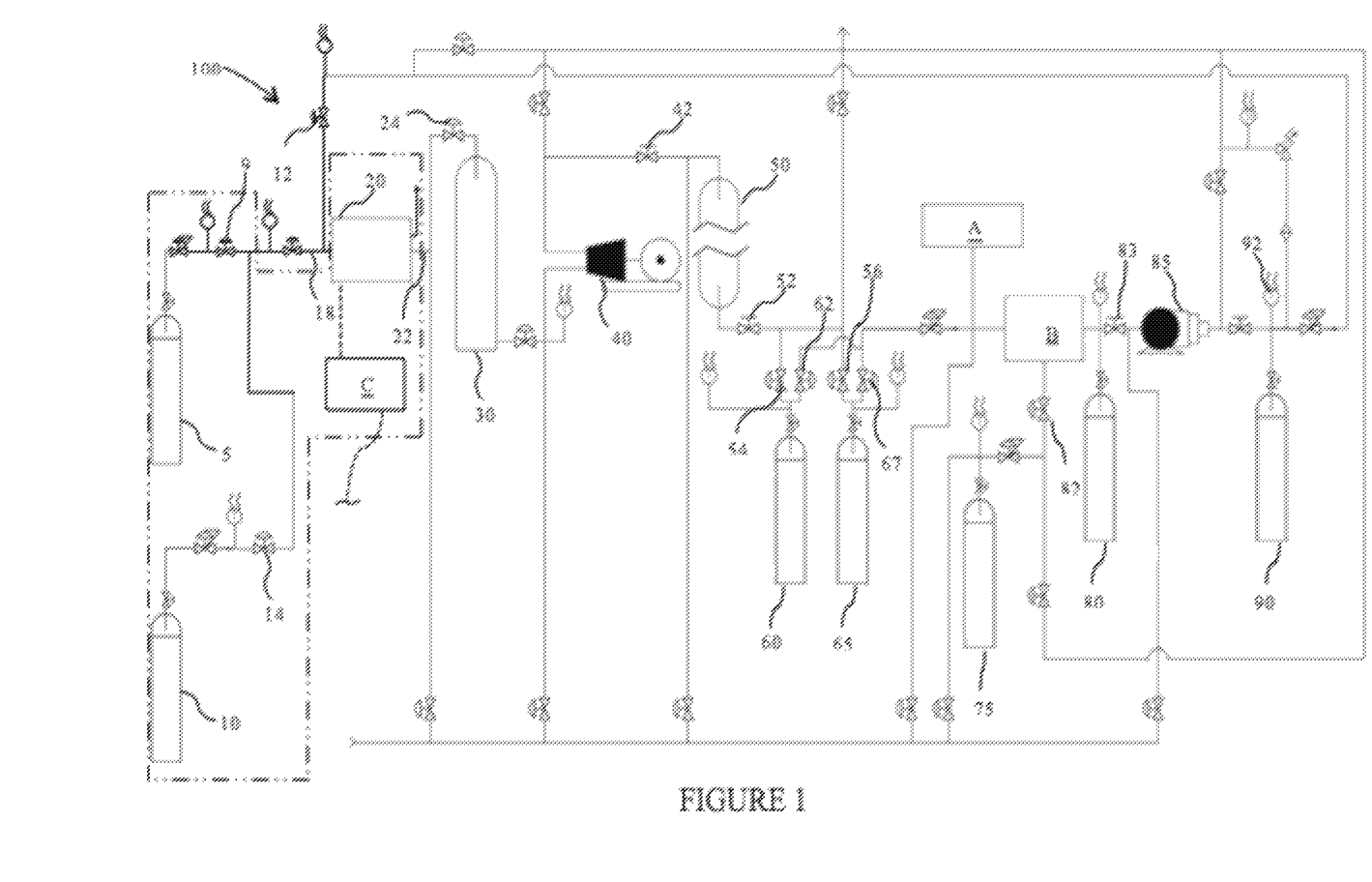
FIG. 1 is a schematic diagram illustrating the configuration of an excimer laser system for analyzing the levels of a lasing enhancing gas present within a gas purification system and the eventual reclamation, rebalancing, and recirculation of the lasing enhancing gas in accordance with one embodiment of the invention.

With reference to FIG. 1, the system 100 for reclaiming, rebalancing and recirculating a laser enhancing gas according to one embodiment of the present invention is described. The laser chamber 20 is a vessel having one or two compartments, designed to hold several atmospheres of corrosive gases. These compartments are designed to known safety standards, such as those specified by ASME. The initial fill of the chamber is directed by control processor C. When initially filling the lasing gases in the laser chamber 20, the laser chamber 20 is first evacuated using the gas recirculation pump, not shown, either via input port 18 or output port 22. The laser chamber 20 is then filled to near the final fill pressure (for example 3000 to 5000 mBar or 40 to 72 psig) using a supply of the lasing gas mixture from a bi-mix or tri-mix gas cylinder 5 and 10 respectively. The supply can be a bi-mix containing only the noble, enhancing gas and gases in the correct ratio, which is approximately 1-5% Ar, 94-98% Ne and 1-100 ppm Xe and preferably 3.5 Ar, 95.5% Ne and 10 ppm Xe which can then be supplemented with halogen from the tri-mix gas cylinder 10 containing the noble, buffer and halogen gases in the proper ratio which is approximately 1-5% Ar, 75-99% Ne, 0.05-20% $F_2$ and preferably 3.5% Ar, 95.5% Ne and 1% $F_2$. The operational discussion that follows is based on a laser chamber 20 having two compartments each of which are filled with the same gases to respected pressures (operate under similar but different pressures). Both lasing compartments operate at the same time and operate while partial gas is being exhausted and refilled. The lasers from both compartments are optically combined for enhancement over one source.

Once the laser chamber 20 is filled with the halogen-rich laser gas mixture from original source gas cylinders 5 and 10, and before operation of the laser 20 begins, the original source gas cylinders 5 and 10 are shut off, e.g. via valves 9 and 14 respectively. While the process can be performed manually it is preferably accomplished automatically under the control of a control processor C which is in electronic communication with each valve and each electrical component in the system of the present invention.

During normal operation of the laser chamber 20, the halogen and enhancing gases are possibly consumed, therefore, at a set period of time, typically between 1 and five minutes under maximum laser use, and preferably between two to three minutes and most preferably every 2 and one-half minutes, control processor C switches between the compartments while being used and partially exhausts and refills the compartment before performing the same function on the other compartment. The lasing gases having been exhausted are directed through outlet port 22 and passed through scrubber 30, via pressure valve 24 to remove or abate the reactive gases present including the halogen gas required for operation of the laser chamber 20. Scrubber 30 is a vessel formed from a suitable material such as stainless steel or nickel and typically contains activated alumina or activated charcoal to scrub the exhausted gases.

Following exhaustion of the used compartment within laser chamber 20 pressure valve 24 is closed, thereby isolating the reclamation, rebalancing and recirculation system of the present invention from the laser chamber 20, and the used compartment is then refilled using gases from original source cylinders 5 an 10. After flowing the exhausted lasing gases through the scrubber 30, the reactive or halogen gases initially present within the exhausted lasing gases will be present at levels less than 1 ppm. The scrubbed gases, now free of the reactive halogen, are next pressurized using compressor 40 and flow to a purifier 50 via valve 42. Purifier 50 may be a single purifier or a purifier train 50 depending on the contaminants that are present in the scrubbed gas. The scrubbed gas may then flow through a second purifier that absorbs moisture, (order of purifiers may be reversed), followed by an additional purifier that removes submicron particles. One or more of the purifiers used may be regenerable.

Exiting the gas purifier train 50, via valve 52 impurities have been reduced from about 100 to 500 ppm to about 1 to 500 ppb levels, the halogen gas has been removed and the noble gases and enhancing gases are flowed into one of two cylinders 60 or 65 where the gas content is analyzed. In the first instance, the purified gas is flowed into cylinder 60 via valve 54. Once cylinder 60 is filled vale 54 closes and valve 56 opens allowing purified gas to be directed into cylinder 65. The purified gas within cylinder 60 is analyzed, by analyzer A, and the concentration of the noble gas, buffer and enhancing gas are determined. Analyzer A, then communicates via the control processor C and valves 62 and 82 will open thereby allowing the analyzed gas to be drawn out of cylinder 60 and the doping gases from cylinder 75. Blender B will adjust the flow rates of these two streams of gases to form a rebalanced bi-mix containing only the noble, enhancing gas and buffer gases in the correct ratio that are reflective of that found in original source cylinder 5 and valves 62 and 82 are then closed. This rebalanced bi-mix then flows into cylinder 80 where the rebalanced bi-mix accumulates. Once the analyzed gas in cylinder 60 is removed valves 62 and 56 will shut, valve 67 will open and the purified gas contained within cylinder 65 will be analyzed while cylinder 60 is filling as a result of valve 54 opening. This batch analysis of the purified gases in cylinders 60 and 65 will continue to cycle while the laser system is operating.

The rebalanced bi-mix gases will continue to accumulate in cylinder 80 until a predetermined pressure is reached where upon valve 83 will open and compressor 85 will pressurize the bi-mix and this recycled bi-mix will be stored in cylinder 90 at a concentration that is equivalent to that of the original source bi-mix stored in cylinder 5. When laser chamber 20 requires a new supply of gas, the tri-mix in original source cylinder 10 will continue to serve as the source of the halogen gas; however, the recycled bi-mix stored in cylinder 90 will be available to fill the compartments within the laser chamber 20 when a predetermined pressure is reached at pressure transducer 92, valve 9 (connected to original source cylinder 5) will be turned off and valve 12 turned on, resulting in the laser chamber 20 being filled using the recycled bi-mix gas stored in cylinder 90. Thus, the system of the present invention provides a method for reclaiming the noble buffer gas used in an excimer laser and producing a recycled bi-mix mixture that can be substituted for the original bi-mix gases, thereby conserving the noble buffer gas and controlling the costs associated therewith. The system of the present invention also provides for the recycling of or the reintroduction of the noble enhancing gas.

Figure 2:
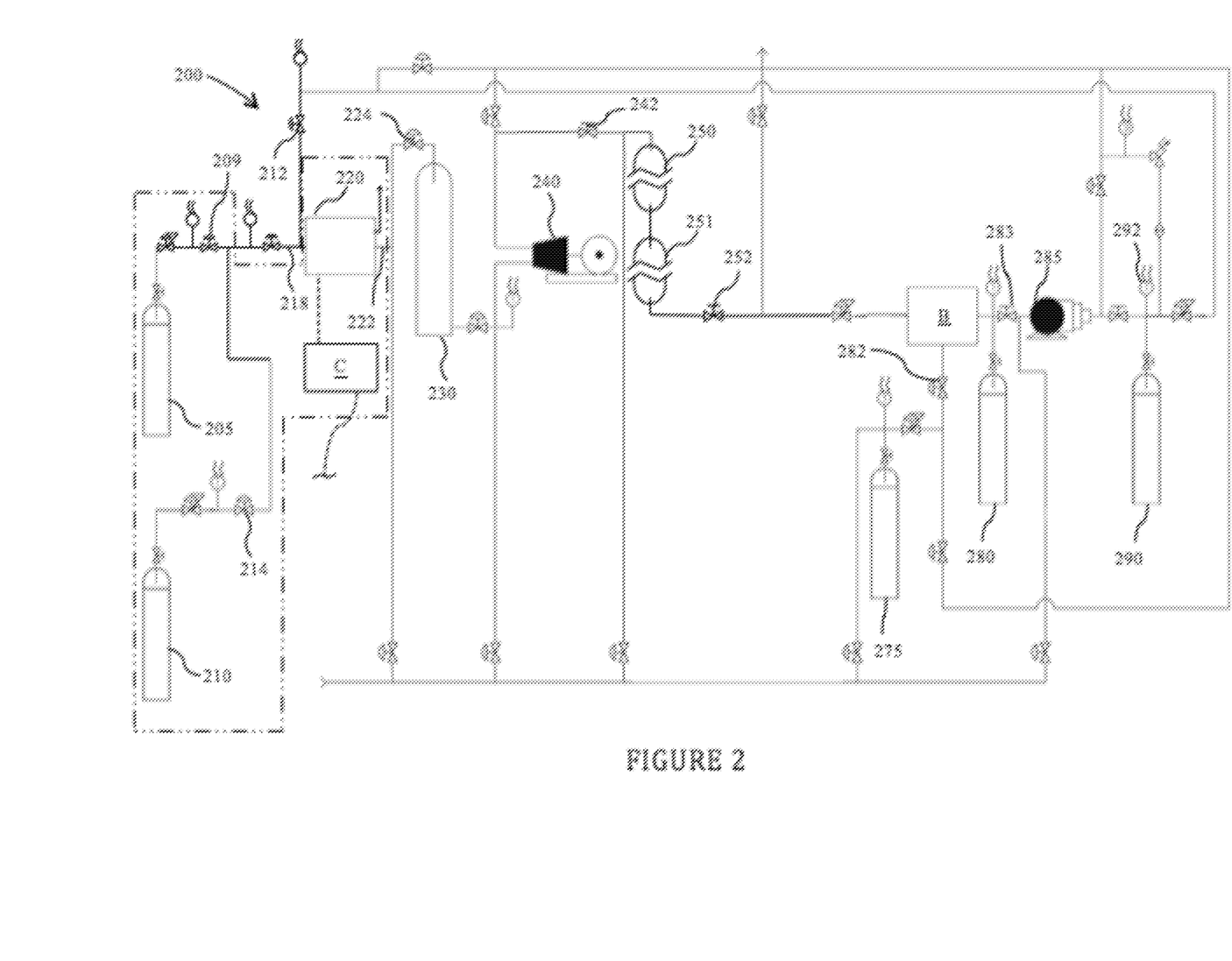
FIG. 2 is a schematic diagram illustrating the configuration of an excimer laser system for the removal of all enhancing gas present within a gas purification system and the reclamation, rebalancing and recirculation of the lasing enhancing gas in accordance with one embodiment of the invention.

In an alternate embodiment illustrated in FIG. 2, a purifier 251 for the removal of the enhancing gas is added to the purifying train 250. Purifier 251 may be achieved by but is not limited to, adsorption by transitional metals, adsorption by high surface area zeolite, alumina, and/or carbon, temperature swing adsorption, pressure swing adsorption. In this particular embodiment since the enhancing gas has been removed it is not necessary to analyze the purified gas to determine the concentration of the enhancing gas as it was in the previous embodiment described in FIG. 1. Since the lasing and buffer gases are not consumed, control processor opens both valves 252 and 282. The purified gas flowing through valve 252 and the doping gas pulled from cylinder 275 are then blended by blender B. Blender B adjusts the flow rates of these two streams of gases to form a rebalanced bi-mix containing only the noble, enhancing and buffer gases in the correct ratio that are reflective of that found in the original source cylinder 205. This rebalanced bi-mix then flows into cylinder 280 where the rebalanced bi-mix accumulates.

The rebalanced bi-mix gases will continue to accumulate in cylinder 280 until a predetermined pressure is reached where upon valve 283 will open and compressor 285 will pressurize the recycled bi-mix and this recycled bi-mix will be stored in cylinder 290 at a concentration that is equivalent to that of the original source bi-mix stored in cylinder 205. The recycled bi-mix stored in cylinder 290 will be available to fill the compartments within the laser chamber 220 when a predetermined pressure is reached at pressure transducer 292, valve 209 (connected to original source cylinder 205) will be turned off and the laser chamber 220 will be filled using the recycled bi-mix gas stored in cylinder 290. Eventually, purifier 251 will be regenerated and the enhancing gas released will be vented.

Figure 3:
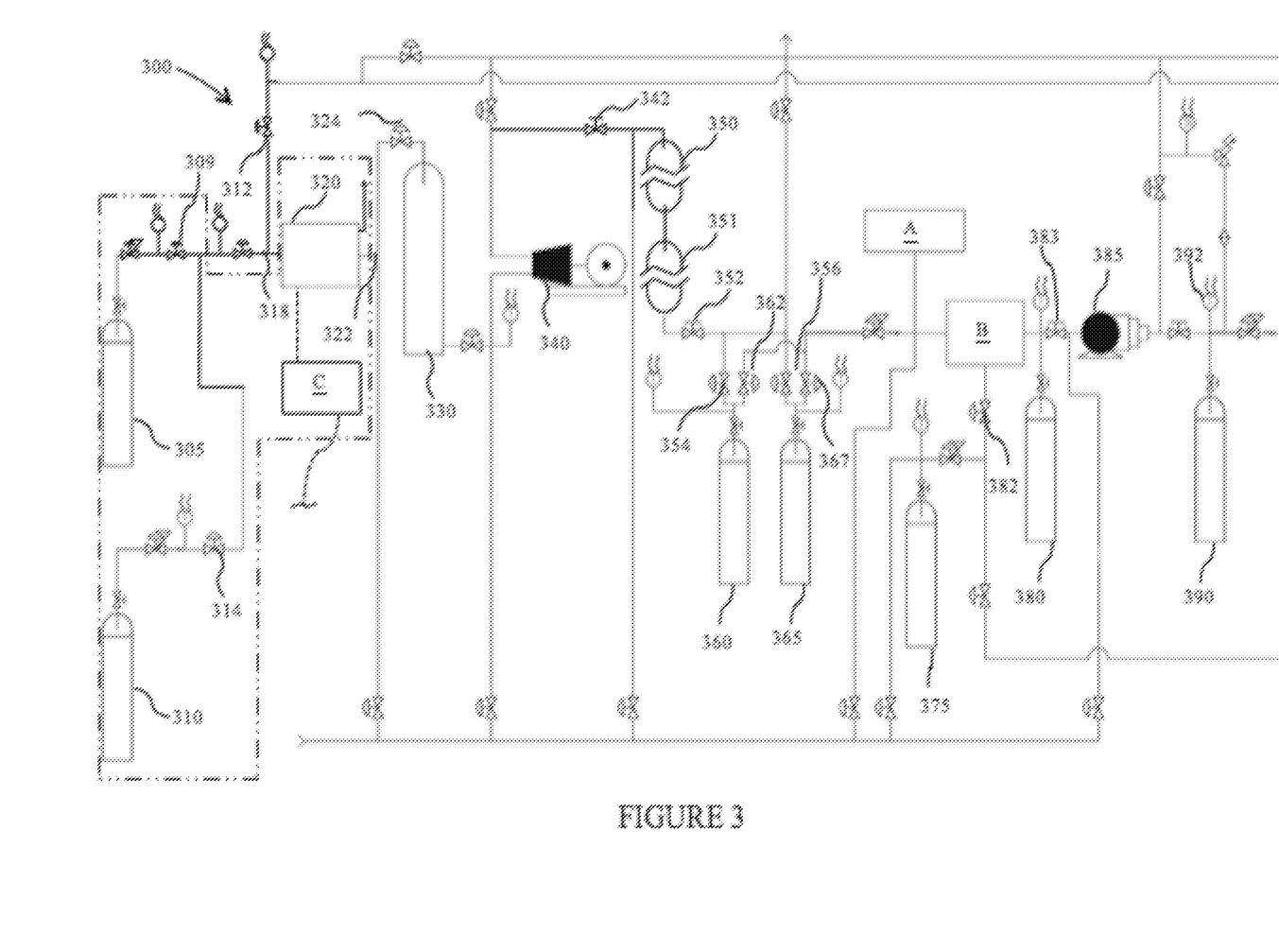
FIG. 3 is a schematic diagram illustrating the configuration of an excimer laser system for the removal of all lasing enhancing gas and partial removal of noble lasing gas present within a gas analyzation and purification system arranged in accordance with one embodiment of the invention.

An alternative embodiment recognizes that the purifier 251, as described in FIG. 2, will remove the enhancing gas and may partially remove the noble lasing gases as in FIG. 1 there exists a process for analyzing the purified gas in order to determine the concentrations of the bi-mix constituents so that the correct amount may be doped back in to form a recycled bi-mix. As illustrated in FIG. 3, purifier 351 is added to the purifying train 350 for the removal of the enhancing gas and partial removal of the lasing gas. Purifier 351 may be, but is not limited to, a means for the removal of the enhancing gas and partial removal of lasing gas by way of an adsorption by transitional metals, adsorption by high surface area zeolite, alumina, and/or carbon, temperature swing adsorption, pressure swing adsorption. Exiting the gas purifier train 350, via valve 352 impurities have been reduced from about 100 to 500 ppm to about 1 to 500 ppb levels, the halogen gas has been removed and the noble lasing gases, and enhancing gases have also been reduced. It is important to note that the purifier train 350 and purifier 351 will have very limited to no effect on the buffer gas and therefore the buffer gas will be largely reclaimed. The purified gas will now flow into one of two cylinders 360 or 365 where the gas content is analyzed. In the first instance, the purified gas is flowed into cylinder 360 via valve 354. Once cylinder 360 is filled valve 354 closes and valve 356 opens allowing purified gas to be directed into cylinder 365. The purified gas within cylinder 360 is analyzed, by analyzer A, and the concentration of one or more of the noble gas, noble buffer or noble enhancing gas are determined. Analyzer A, then communicates via the control processor C and valves 362 and 382 will open thereby allowing the analyzed gas to be drawn out of cylinder 360 and the doping gases from cylinder 375. Blender B will adjust the flow rates of these two streams of gases to form a rebalanced bi-mix containing only the noble, enhancing gas and buffer gases in the correct ratio that are reflective of that found in the original source cylinder 305. This rebalanced bi-mix then flows into cylinder 380 where the rebalanced bi-mix accumulates. Once the analyzed gas in cylinder 360 is removed valves 362 and 356 will shut, valve 354 will open and the purified gas contained within cylinder 365 will be analyzed while cylinder 360 is filling. This batch analysis of the purified gases in cylinders 360 and 365 will continue to cycle while the laser system is operating.

The rebalanced bi-mix gases will continue to accumulate in cylinder 380 until a predetermined pressure is reached where upon valve 383 will open and compressor 385 will pressurize the recycled bi-mix and this recycled bi-mix will be stored in cylinder 390 at a concentration that is equivalent to that of the original source bi-mix stored in cylinder 305. The recycled bi-mix stored in cylinder 390 will be available to fill the compartments within the laser chamber 320 when a predetermined pressure is reached at pressure transducer 392 valve 309 (connected to original source cylinder 205) will be turned off, valve 312 turned on and the laser chamber 320 will be filled using the recycled bi-mix gas stored in cylinder 390. Eventually, purifier 351 will be regenerated to continue to remove impurities.

Figure 4:
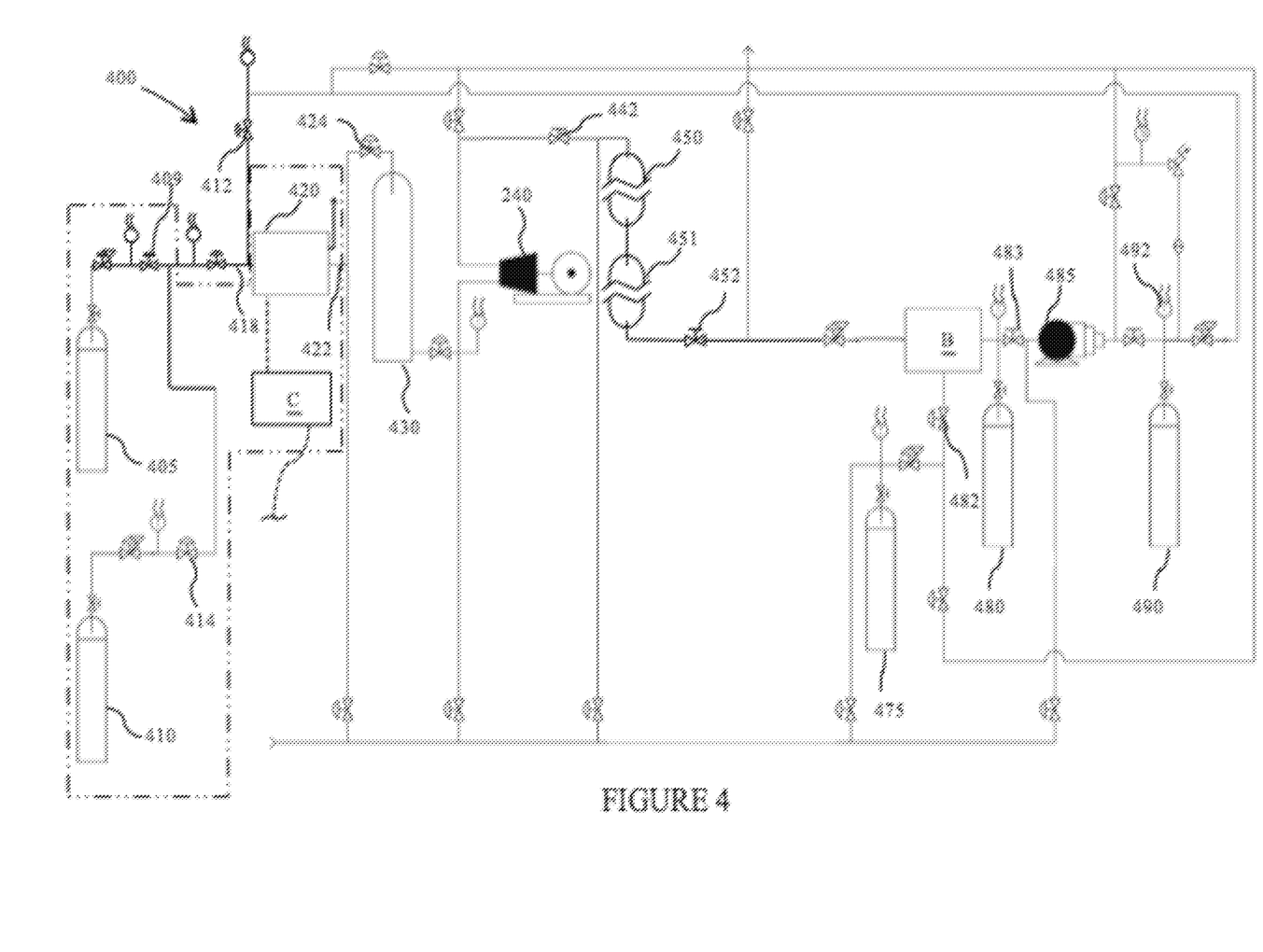
FIG. 4 is a schematic diagram illustrating the configuration of an excimer laser system for the removal of all noble lasing gas and lasing enhancing gas present within a gas analyzation and purification system arranged in accordance with one embodiment of the invention.

In an alternative embodiment, illustrated in FIG. 4, all of the lasing gas as well as all of the enhancing gas is removed from the purified gas and therefor it is not necessary to analyze the content of the gas leaving purifier 451. The buffer gas being lighter than the lasing and enhancing gases will not be removed to an appreciable extent by the purifiers and therefore, this rare material will be reclaimed. Again, as discussed previously, purifier 451 may be achieved by, but is not limited to, the use of: adsorption by transitional metals, adsorption by high surface area zeolite, alumina, and/or carbon, temperature swing adsorption, pressure swing adsorption. In this particular embodiment since both the lasing and enhancing gases have been removed it is not necessary to analyze the purified gas to determine the concentration of the lasing and enhancing gases as it was in the previous embodiment described in FIG. 3. Since the buffer gas is not consumed, control processor opens both valves 452 and 482. The purified gas, which should at this point be essentially buffer gas will flow through valve 452 and the doping gas pulled from cylinder 475 are then blended by blender B. Blender B adjusts the flow rates of these two streams of gases to form a rebalanced bi-mix containing only the noble, enhancing and buffer gases in the correct ratio that are reflective of that found in the original source cylinder 405. This rebalanced bi-mix then flows into cylinder 480 where the rebalanced bi-mix accumulates.

The rebalanced bi-mix gases will continue to accumulate in cylinder 480 until a predetermined pressure is reached where upon valve 483 will open and compressor 485 will pressurize the recycled bi-mix and this recycled bi-mix will be stored in cylinder 490 at a concentration that is equivalent to that of the original source bi-mix stored in cylinder 205. The recycled bi-mix stored in cylinder 290 will be available to fill the compartments within the laser chamber 420 when a predetermined pressure is reached at pressure transducer 492 valve 409 (connected to original source cylinder 405) will be turned off and the laser chamber 420 will be filled using the recycled bi-mix gas stored in cylinder 490. Eventually, purifier 451 will be regenerated to continue to remove impurities.

As discussed in detail above and shown in FIG. 1, when initially filling the lasing gases in the laser chamber 20, the laser chamber 20 is first evacuated using the gas recirculation pump, not shown, either via input port 18 or output port 22. The laser chamber 20 is then filled to near the final fill pressure (for example 3000 to 5000 mBar or 40 to 72 psig) using a supply of the lasing gas mixture from a bi-mix or tri-mix gas cylinder 5 and 10 respectively. Traditionally, the house supply is a bi-mix containing only the noble, buffer gas, and enhancing gas in the correct ratio, which is approximately 1-5% Ar, 94-98% Ne and 1-100 ppm Xe, respectively and preferably 3.5% Ar, 95.5% Ne and 10 ppm Xe, respectively which can then be supplemented with halogen from the tri-mix gas cylinder 10 containing the noble, buffer and halogen gases in the proper ratio which is approximately 1-5% Ar, 75-99% Ne, 0.05-20% $F_2$, and preferably 3.5% Ar, 95.5% Ne and 1% $F_2$. However, in the following alternative embodiment described below and shown in FIG. 5, the enhancing gas, Xe, is added to the tri-mix, forming a quad-mix, in the same amount as that found in the bi-mix. For example, if the bi-mix contains 10 ppm Xe then 10 ppm Xe would also be present in the quad-mix thereby eliminating the dilution of Xe that takes place when the standard bi-mix and tri-mix are combined. Use of the quad-mix formulation assures the user that the combination of the bi-mix and quad-mix in the chamber will never be diluted. Additionally, the quad-mix formulation could possibly eliminate any blending that is needed during recirculation, as discussed above in previous embodiments.

Figure 5:
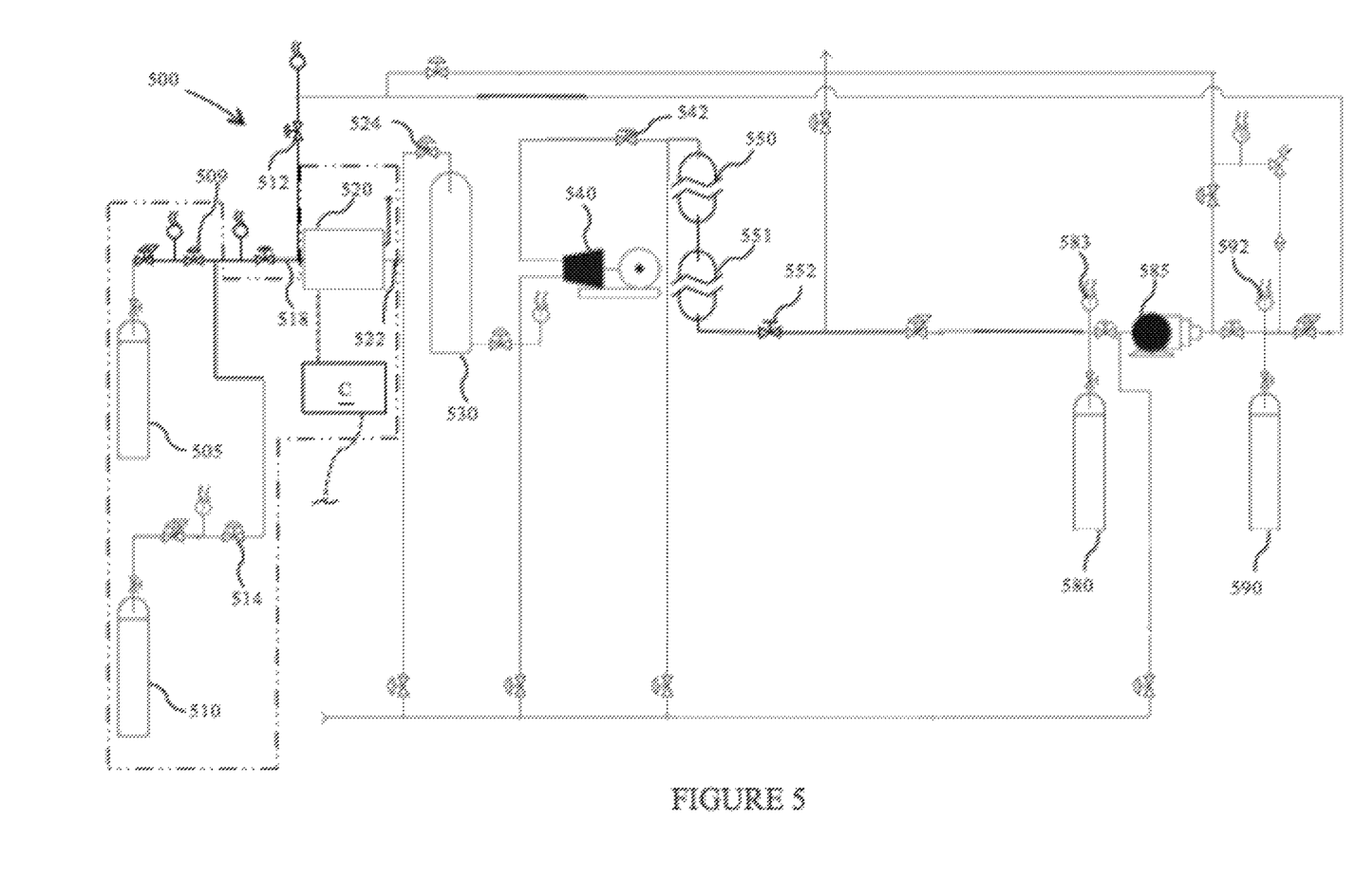
FIG. 5 is a schematic diagram illustrating the configuration of an excimer laser system having the enhancing gas introduced into the tri-mix to enhance and simplify the recirculation system arranged in accordance with one embodiment of the invention.

As illustrated in FIG. 5, the house bi-mix gas which is approximately 1-5% Ar, 94-98% Ne and 1-100 ppm Xe and preferably 3.5% Ar, 95.5% Ne and 10 ppm Xe stored in cylinder 505 can then be supplemented with halogen from the quad-mix gas cylinder 510 containing the noble, buffer, halogen gases and the enhancing gas in the proper ratio which is approximately 1-5% Ar, 75-99% Ne, 0.05-20% $F_2$ and 1-100 ppm Xe; and preferably 3.5% Ar, 95.5% Ne, 1% $F_2$, and Xe 10 ppm. Once the laser chamber 520 is filled with the halogen-rich laser gas mixture from original source gas cylinders 505 and 510, and before operation of the laser 520 begins, the original source gas cylinders 505 and 510 are shut off, e.g. via valves 509 and 514 respectively. While the process can be performed manually it is preferably accomplished automatically under the control of a control processor C which is in electronic communication with each valve and each electrical component in the system of the present invention.

During normal operation of the laser chamber 520, the halogen is possibly consumed, therefore, at a set period of time, typically between 1 and five minutes under maximum laser use, and preferably between two to three minutes and most preferably every 2 and one-half minutes, control processor C switches between the compartments while being used and partially exhausts and refills the compartment before performing the same function on the other compartment. The lasing gases having been exhausted are directed through outlet port 522 and passed through scrubber 530, via pressure valve 524 to remove or abate the reactive gases present including the halogen gas required for operation of the laser chamber 520. Scrubber 530 is a vessel formed from a suitable material such as stainless steel or nickel and typically contains activated alumina or activated charcoal to scrub the exhausted gases.

Following exhaustion of the used compartment within laser chamber 520 pressure valve 524 is closed, thereby isolating the reclamation, rebalancing and recirculation system of the present invention from the laser chamber 520, and the used compartment is then refilled using gases from original house source cylinders 505 and 510. After flowing the exhausted lasing gases through the scrubber 530, the halogen gases initially present within the exhausted lasing gases will be present at levels less than 1 ppm. The scrubbed gases, now free of the reactive halogen, are next pressurized using compressor 540 and flow to a purifier 550 via valve 542. Purifier 550 may be a single purifier or a purifier train 551 depending on the contaminants that are present in the scrubbed gas. The scrubbed gas may then flow through a second purifier that absorbs moisture, (order of purifiers may be reversed), followed by an additional purifier that removes submicron particles. One or more of the purifiers used may be regenerable.

Again, as discussed previously, purifier 550 may be achieved by, but is not limited to, the use of: adsorption by transitional metals, adsorption by high surface area zeolite, alumina, and/or carbon, temperature swing adsorption, pressure swing adsorption. In this particular embodiment since the lasing gas has been removed it is not necessary to analyze the purified gas to determine the concentration of the enhancing gas as it was in the previous embodiment described in FIG. 3. Since the noble, buffer and enhancing gases are not consumed, control processor opens both valves 552 and 582. The purified gas, which should at this point be essentially noble, buffer and enhancing gases will flow through valve 552 and flows into cylinder 580 where the rebalanced quad-mix accumulates.

The rebalanced quad-mix gases will continue to accumulate in cylinder 580 until a predetermined pressure is reached where upon valve 583 will open and compressor 585 will pressurize the recycled bi-mix and this recycled bi-mix will be stored in cylinder 590 at a concentration that is equivalent to that of the original source bi-mix stored in cylinder 505. The recycled bi-mix stored in cylinder 590 will be available to fill the compartments within the laser chamber 520 when a predetermined pressure is reached at pressure transducer 592 valve 509 (connected to original source cylinder 505) will be turned off and the laser chamber 520 will be filled using the recycled bi-mix gas stored in cylinder 590 in combination with the quad-mix stored in cylinder 510. Eventually, purifier 551 will be regenerated to continue to remove impurities.

Figure 6:
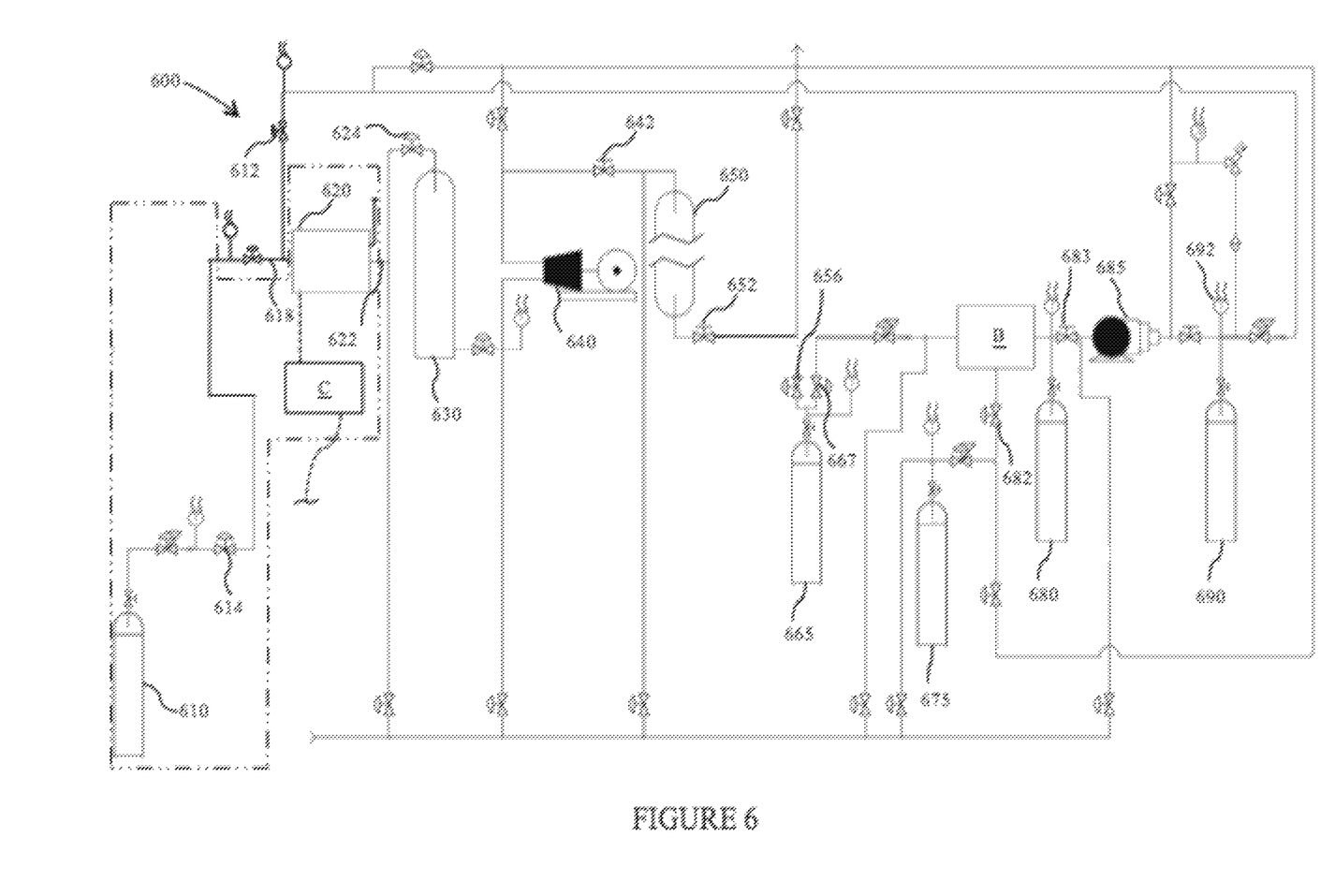
FIG. 6 is a schematic diagram illustrating the configuration of an excimer laser system having the enhancing gas introduced into the tri-mix to enhance and simplify the recirculation system arranged in accordance with one embodiment of the invention.

In an alternative embodiment, as illustrated in FIG. 6, the house bi-mix gas cylinder is eliminated and the quad-mix gas cylinder 610 containing the noble, buffer, halogen gases and the enhancing gas in the proper ratio which is approximately 1-5% Ar, 75-99% Ne, 0.05-20% $F_2$, and 1-100 ppm Xe; and preferably 3.5% Ar, 94.5% Ne, 1% $F_2$, and Xe 10 ppm is initially used. Once the laser chamber 620 is filled with the halogen-rich laser gas mixture from original source gas cylinder 610, and before operation of the laser 620 begins, the original source gas cylinder 610 is shut off, e.g. via valve 614. While the process can be performed manually it is preferably accomplished automatically under the control of a control processor C which is in electronic communication with each valve and each electrical component in the system of the present invention. As discussed previously following exhaustion of the used compartment within laser chamber 620 pressure valve 624 is closed, thereby isolating the reclamation, rebalancing and recirculation system of the present invention from the laser chamber 620, and the used compartment is then refilled using gases from original house source cylinder 610. After flowing the exhausted lasing gases through the scrubber 630, the halogen gases initially present within the exhausted lasing gases will be present at levels less than 1 ppm. The scrubbed gases, now free of the reactive halogen, are next pressurized using compressor 640 and flow to a purifier 650 via valve 642. Purifier 650 may be a single purifier or a purifier train 651 depending on the contaminants that are present in the scrubbed gas. The scrubbed gas may then flow through a second purifier that absorbs moisture, (order of purifiers may be reversed), followed by an additional purifier that removes submicron particles. One or more of the purifiers used may be regenerable.

Again, as discussed previously, purifier 651 may be achieved by, but is not limited to, the use of: adsorption by transitional metals, adsorption by high surface area zeolite, alumina, and/or carbon, temperature swing adsorption, pressure swing adsorption. In this particular embodiment since the lasing gas has been removed it is not necessary to analyze the purified gas to determine the concentration of the enhancing gas as it was in the previous embodiment described in FIG. 3. Since the noble, buffer and enhancing gases are not consumed, control processor opens both valves 652 and 656 and directs the gases into buffer cylinder 665. Buffer cylinder 665 should contain the correct amount of noble, buffer, and enhancing gas, just needs 1% $F_2$, 95.5% Ne, 3.5% Ar, and 10 ppm Xe to create, 0.1% F2, 96.4% Ne, 3.5% Ar, and 10 ppm Xe which is exactly what is needed in the laser with no blending at the laser, as in this embodiment we blend at the recycling system. Also, in this case the house quad-mix in cylinder 610 is 0.1% F2, 96.4% Ne, 3.5% Ar, and 10 ppm Xe.

Afterwards the control processor opens both valves 667 and 682. The purified gas, which should at this point be essentially noble, buffer and enhancing gases will flow through valve 667 and the doping gas, which is a 0.5-20% $F_2$ and preferably 1% $F_2$ pulled from cylinder 675, through valve 682, are then blended by blender B. Blender B adjusts the flow rates of these two streams of gases to form a rebalanced quad-mix in the correct ratio that are reflective of that found in the original source cylinder 610. This rebalanced quad-mix then flows into cylinder 680 where the rebalanced quad-mix accumulates.

The rebalanced quad-mix gases will continue to accumulate in cylinder 680 until a predetermined pressure is reached where upon valve 683 will open and compressor 685 will pressurize the recycled quad-mix and this recycled quad-mix will be stored in cylinder 690 at a concentration that is equivalent to that of the source quad-mix stored in cylinder 610. The recycled quad-mix stored in cylinder 690 will be available to fill the compartments within the laser chamber 620 when a predetermined pressure is reached at pressure transducer 692 valve 614 (connected to cylinder 610) will be turned off and the laser chamber 620 will be filled using the recycled quad-mix gas stored in cylinder 690. Eventually, purifier 651 will be regenerated to continue to remove impurities.

Figure 7:
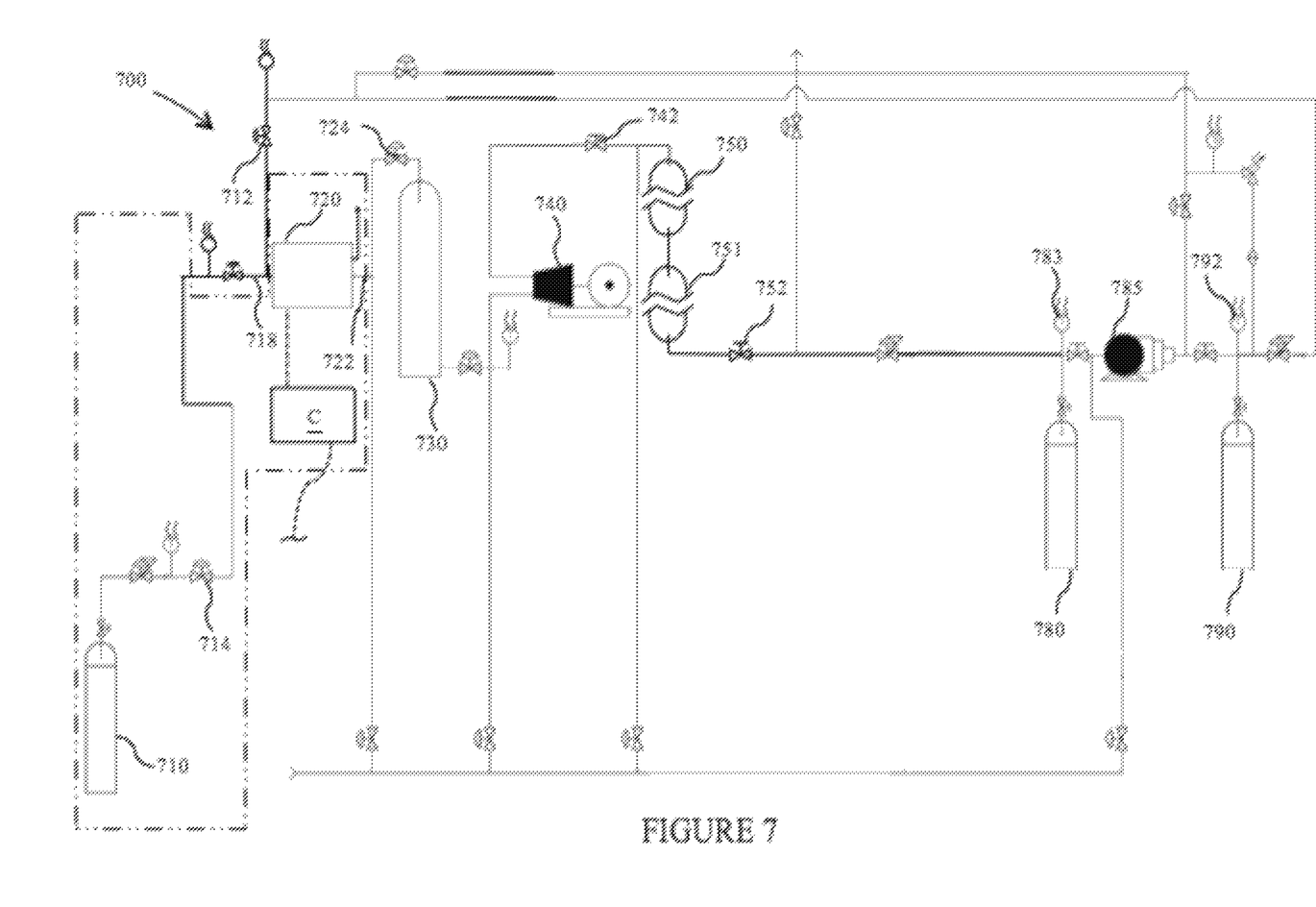
FIG. 7 is a schematic diagram illustrating the configuration of an excimer laser system having the enhancing gas introduced into the tri-mix to enhance and simplify the recirculation system arranged in accordance with one embodiment of the invention.

In an alternative embodiment, shown in FIG. 7, reclamation, rebalancing, and recirculation of the lasing enhancing gas system 700 a quad-mix and a tri-mix is used as described previously and shown in FIG. 6; however, instead of blending and doping fluorine back into the reclaimed tri-mix the tri-mix that accumulates in cylinder 790 is introduced into laser chamber along with the quad-mix from source cylinder 710.

An alternate embodiment to measure the concentration of the enhancing gas during normal operation of the laser chamber is disclosed below. An energy monitor and the control processor monitor one or more operating conditions e.g. output power, output energy, enhancing gas content of the laser, and adjust the input of enhancing gas, i.e. enhancing rich gas mixture, as the case may be, from a gas cylinder to ensure each monitored operating condition stays within a predetermined range or above a predetermined operating level. Thermopile or photodiode sensors can be used to measure optical power and/or energy of the laser. The enhancing gas concentration can be measured by any conventional meter particular to the specific enhancing gas. As the operating condition of the laser returns to nominal operating conditions, e.g. above a threshold level or within desired range, the control processor halts the input of enhancing gas. The mass flow controllers can be calibrated by monitoring the rate of rise of the pressure in the chamber during refills. This operation could be performed manually by the operator or the system could be programmed to perform this calibration automatically and periodically. Many techniques can be used for monitoring the enhancing gas concentration. For example, the operating current of a prior art voltage electrostatic precipitator is a function of the enhancing gas concentration. Other detectors arranged to measure the electrical impedance of the laser gas is indicative of the enhancing gas concentration. The thermal conductivity of the laser gas can be measured as an indication of enhancing gas concentration. Enhancing gas concentration can also be determined by optical absorption techniques, optical emission techniques and photo acoustic techniques. Electrochemical cells can also be used to monitor enhancing gas concentration. These cells are currently commercially available for measuring enhancing concentration at trace levels.

While the invention has been described in detail herein in accord with certain preferred embodiments thereof, many modifications and changes therein may be effected by those skilled in the art. Persons skilled in the art will recognize that the principals discussed above with respect to ArF excimer lasers will apply equally well to KrF excimer lasers. Persons skilled in the art of excimer laser design will also recognize that the feedback control system could be used to purposely vary the enhancing gas concentration on a substantially real time basis either for the purpose of producing a laser beam having a time variation or for the purpose of maintaining the beam parameters constant in which case the enhancing gas variation would be chosen to compensate for some effect which would otherwise have produced a time variation in the beam output. Accordingly, it is intended by the appended claims to cover all such modifications and changes as fall within the true spirit and scope of the invention.

Without further elaboration it is believed that one skilled in the art can, using the description set forth above, utilize the invention to its fullest extent.

Having disclosed several embodiments, it will be recognized by those of skill in the art that various modifications, alternative constructions, and equivalents may be used without departing from the spirit of the disclosed embodiments. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the dielectric material" includes reference to one or more dielectric materials and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. An excimer laser system comprising:
   a laser chamber comprising one or more compartments wherein each compartment contains a lasing gas quad-mix at operating concentrations for operating the laser, the laser chamber includes at least one port for introducing and exhausting said lasing gas quad-mixture from said laser chamber;
   a first cylinder containing an original lasing gas quad-mix source comprising a noble lasing gas, a buffer gas, a halogen gas, and an enhancing gas coupled to said port for introducing said lasing gas;
   a scrubber coupled to the gas port for removal of said halogen gas from said lasing gas exhausted from said laser chamber;
   at least one gas purifier in fluid communication with said scrubber wherein said halogen free lasing gas is purified forming a recycled gas mixture;
   a second cylinder for containing said recycled gas mixture in fluid communication with a compressor for compressing said recycled gas mixture; and
   a third cylinder wherein said third cylinder stores said compressed recycled gas mixture and is in fluid communication with an inlet of said at least one port of said laser chamber.

2. The excimer laser system of claim 1, wherein said recycled gas mixture comprises approximately 1-5% Ar, 94-98% Ne, and 1-100 ppm Xe.

3. The excimer laser system of claim 2, wherein said recycled gas mixture comprises 3.5% Ar, 95.5% Ne, and Xe 10 ppm.

4. The excimer laser system of claim 1, wherein said recycled gas mixture comprises 1-5% Ar, 75-99 Ne, and 0.05-20% $F_2$.

5. The excimer laser of claim 4, wherein said recycled gas mixture comprises approximately 3.5% Ar, 99.5% Ne, and 1% $F_2$.

6. The excimer laser of claim 1, further comprises a blender positioned between and in fluid communication with said second cylinder and said compressor.

7. The excimer laser of claim 6, further comprises a fourth cylinder in fluid communication with said blender wherein said fourth cylinder contains said halogen gas.

8. The excimer laser of claim 7, further comprises a fifth cylinder interposed between and in fluid communication with said blender and said compressor.

9. The excimer laser of claim 7, wherein said recycled gas mixture contained in said second cylinder and said halogen gas contained in said fourth cylinder are drawn into said blender to form a recycled quad-mix.

10. The excimer laser of claim 9, wherein said recycled quad-mix is directed into a fifth cylinder interposed between and in fluid communication with said blender and said compressor.

11. The excimer laser of claim 10, wherein said quad-mix is drawn out of said fifth cylinder by said compressor, compressed and stored in said third cylinder.

12. The excimer laser system of claim 9, wherein said recycled quad-mix comprises approximately 1-5% Ar, 99% Ne, 0.05-20% $F_2$, and 1-100 ppm Xe.

13. The excimer laser system of claim 9, wherein said recycled quad-mix comprises 3.5% Ar, 94% Ne, 1% $F_2$, and Xe 10 ppm.

14. The excimer laser system of claim 9, wherein said recycled quad-mix comprises 3.5% Ar, 95.4% Ne, 0.1% $F_2$, and Xe 10 ppm.

15. The excimer laser system of claim 1, wherein said recycled gas mixture comprises said noble gas at a concentration of approximately 1-5%, said buffer gas at a concentration of approximately 75-99%, and said enhancing gas at a concentration of approximately 1-100 ppm.

16. The excimer laser system of claim 15, wherein said recycled gas mixture comprises 3.5% Ar, 95.5% Ne, and Xe 10 ppm.

17. The excimer laser system of claim 9, wherein said recycled quad-mix comprises said noble gas at a concentration of approximately 1-5%, said buffer gas at a concentration of approximately 75-99%, said halogen gas at a concentration of approximately 0.05-20%, and said enhancing gas is present at a concentration of approximately 1-100 ppm.

18. The excimer laser system of claim 17, wherein said noble gas is Ar, said buffer gas is Ne, said a halogen gas is $F_2$ and said enhancing gas is Xe.

19. An excimer laser system comprising:
a laser chamber comprising one or more compartments wherein each compartment contains a lasing gas quad-mix at operating concentrations for operating the laser, the laser chamber includes at least one port for introducing and exhausting said lasing gas quad-mixture from said laser chamber;
a first cylinder containing an original lasing gas quad-mix source comprising a noble lasing gas, a buffer gas, a halogen gas, and an enhancing gas coupled to said port for introducing said lasing gas;
a scrubber coupled to the gas port for removal of said halogen gas from said lasing gas exhausted from said laser chamber;
at least one gas purifier in fluid communication with said scrubber wherein said halogen free lasing gas is purified forming a recycled gas mixture;
a second cylinder for containing said recycled gas mixture in fluid communication with a compressor for compressing said recycled gas mixture and a blender in fluid communication with both said second cylinder and said compressor; and
a third cylinder wherein said third cylinder stores said compressed recycled gas mixture and is in fluid communication with an inlet of said at least one port of said laser chamber;
a fourth cylinder in fluid communication with said blender wherein said fourth cylinder contains said halogen gas.

* * * * *